May 26, 1953 H. G. BENZ 2,639,685
TIRE PRESSURE INDICATOR
Filed Feb. 2, 1951
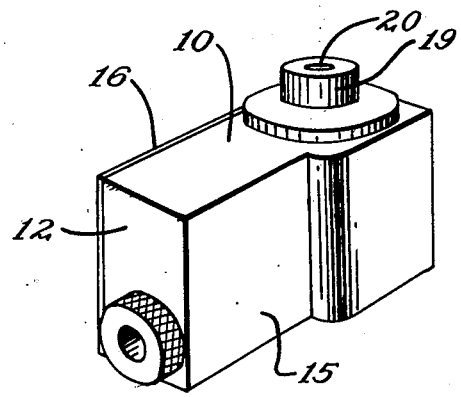
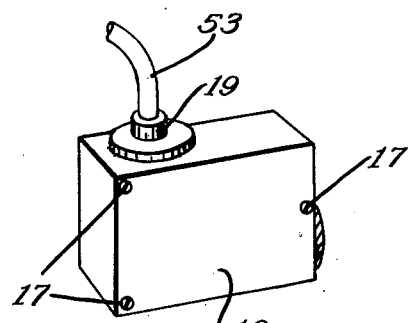
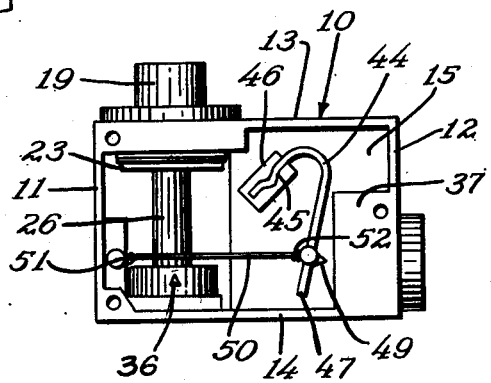
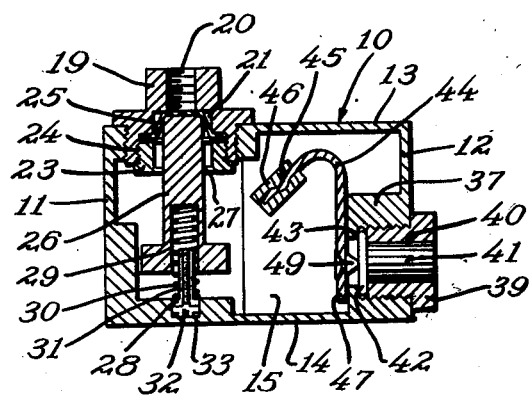
INVENTOR
Herbert G. Benz
BY Robert M. Dunning
ATTORNEY Patented May 26, 1953

2,639,685

UNITED STATES PATENT OFFICE 2,639,685

TIRE PRESSURE INDICATOR

Herbert G. Benz, St. Paul, Minn.; George W. Benz, executor of the estate of said Herbert G. Benz, deceased Application February 2, 1951, Serial No. 209,009

7 Claims. (Cl. 116—34)

My invention relates to an improvement in tire pressure indicator and deals particularly with a type of indicator which acts to explode a cartridge when tire pressure falls below a predetermined point.

Various types of tire pressure alarms have been devised. Certain of these devices contain a blank cartridge and a hammer arranged to explode the cartridge when the tire pressure falls below a predetermined point. Difficulty is experienced in keeping these devices from operating at the wrong time, providing an inaccurate alarm. As the tire strikes an obstruction or passes over an uneven portion of the road, the pressure within the tire often fluctuates due to sudden shock. It is difficult to provide a trigger arrangement which will function equally at the desired time without producing false alarms from time to time.

An object of the present invention lies in the provision of a tire pressure indicator which is simple in form and yet which functions effectively under normal conditions of operation. The device is so arranged that the hammer will not actuate under normal tire fluctuations to provide a false alarm. Accordingly the specific arrangement disclosed appears more accurate than other arrangements with which I am familiar.

An object of the present invention lies in the provision of a tire pressure indicator which includes an explosive cartridge and a spring urged hammer for actuating the cartridge and including a cord or tie member which holds the hammer in inoperative position. The cord or tie is arranged in the path of movement of a plunger which is normally held in one extreme position by tire pressure. A spring is provided for urging the plunger in the opposite direction, the spring being of sufficient tension to overcome a predetermined tire pressure. Thus when the tire pressure within the tire drops to a predetermined minimum the spring urges the plunger in a direction to cause the knife blade supported thereby to cut the cord or tie and to release the hammer.

A feature of the present invention lies in the fact that the hammer is effectively held in inoperative position until the plunger moves sufficiently to cut the tie. Small fluctuations of the plunger make take place without endangering the cord. However, when the spring pressure overcomes the reduced tire pressure due to a leak in the tire, the knife on the piston will cut the cord and the cartridge will be exploded.

These and other objects and novel features of my invention will be more clearly and fully set forth in the following specification and claims.

In the drawings forming a part of my specification:

Figure 1 is a side elevation view of the device in readiness for use.

Figure 2 is a perspective view of the device.

Figure 3 is a side elevational view of the device illustrated in Figure 1, the cover plate having been removed therefrom to illustrate the appearance of the interior of the device.

Figure 4 is a sectional view showing the relative location of the parts after the cord has been cut and the hammer released.

Figure 5 is a perspective view of a detail portion of the device.

The tire pressure indicator includes a housing 10 which is shown in generally rectangular form having a pair of spaced end walls 11 and 12, a pair of side walls 13 and 14, and a base wall 15. The closure plate 16 is secured by cap screws or other similar means 17 to the open side of the enclosures parallel to the base panel 15 to normally seal the interior of the casing.

A tubular fitting 19 is screwed into the wall 13 of the casing 10, the fastening structure being best illustrated in Figure 4. The fitting 19 is provided with a passage 20 therethrough communicating with an enlarged axial chamber 21 near its lower end. The plug 23 is threaded into an internally threaded enlarged diameter portion 24 of the fitting 19. The plug 23 acts to peripherally clamp in place a resilient diaphragm 25 which acts as a seal between the chamber 21 of the fitting 19 and the plug 24. This diaphragm is capable of stretching sufficiently to allow the device to function in the manner which will be later described.

A plunger 26 is slidably supported within the casing 10, one end of the plunger extending through an aperture 27 in the plug 23 for guidance thereby. The plunger 26 is provided with an axial socket 29 in the end thereof remote from the diaphragm 25. A spring 30 is provided in the socket or aperture 29 and encircles a tube 31 having an enlarged end 28 forming a shoulder larger than the outside diameter of the spring and against which the spring may bear. The tube is internally threaded to admit an adjusting screw 32, the head of which bears against the base of a socket 33 in the inside surface of the housing 10. By turning the adjusting screw counter-clockwise the tension on the spring 30 will be increased, thereby increasing the resistance to air pressure against the diaphragm 25, enabling the device to operate on a high pressure tire. By turning the adjusting screw clockwise, the resistance to air pressure against the diaphragm 25 is lowered and the alarm may be effective on a low pressure time.

The plunger 26 is provided with an enlarged head 34 thereupon which is preferably provided with a flat side 35 engageable against the casing wall 15 to hold the plunger from rotation. A knife blade 36 is removably attached to the plunger head 34. This knife blade 36 forms the cutting blade for cutting the flexible cord or tie holding the cartridge hammer in inoperative position.

The casing wall 12 is provided with an internally extending hollow boss 37 which is internally threaded to accommodate an externally threaded thumb nut or bushing 39. This thumb nut 39 is provided with an axial bore 40 of proper diameter to accommodate an explosive cartridge 41. The cartridge 41 is provided with an enlarged bead 42 at one end thereof which is designed to fit between a shoulder 43 on the end of the boss 37 and the end of the thumb nut or bushing 39. Thus the bead of the cartridge is clamped in place holding the cartridge end directed outwardly in the bore 40. When the cartridge explodes the force may pass directly to atmosphere, causing a sharp report.

The hammer mechanism includes a generally U-shaped spring arm 44 which is anchored at one end 45 to a supporting box 46 on the base panel 15 of the housing. The other end 47 of the spring arm 44 supports a pointed hammer element 49 which forms a firing pin when the hammer springs against the cartridge. The spring arm 44 is normally held in inoperative position by a loop or length of cord 50 which is fastened at one end to a hook member 51 on the casing wall 11 and is connected at the other end to a suitable loop 52 on the spring arm end 47.

In mounting the device upon a vehicle wheel, it is desirable to position the device on the wheel close to the axle, with the hose connection 53 connecting the fitting 19 to the tire valve stem and extending downwardly from the housing 10, and the cartridge pointing forwardly. When the tire is inflated and is connected to the fitting 19, the plunger 26 is in the position illustrated in Figure 3 of the drawings. The loop or cord 50 is next connected in place to hold the hammer 44 in inoperative position and a cartridge is then inserted into position within the thumb nut 39.

When the tire pressure within the tire falls below a predetermined figure which has been set by the adjusting screw 32, the plunger 26 is urged downwardly by the spring 30, deflecting the diaphragm 25. The cartridge can not be accidentally fired as long as the cord or loop 50 remains attached and the plunger 26 is usually held by the diaphragm and by air tire pressure with the knife blade 36 in spaced relation to this cord. The knife blade 36 may move a substantial distance without contacting the cord, thus allowing certain fluctuations in tire pressure without injuring the cord.

When the tire pressure within the tire falls to a predetermined extent, the spring 30 urges the plunger downwardly until the knife blade 36 engages the cord 50 and cuts the same. The knife blade 36 is usually sufficiently sharp to easily cut the cord and the cutting action is simplified because of the tautness of the cord. As soon as the cord is cut the spring arm 44 swings the firing pin 49 against the cartridge end 42, exploding the cartridge and providing the desired alarm.

In accordance with the patent statutes, I have described the principles of construction and operation of my tire pressure alarm, and while I have endeavored to set forth the best embodiment thereof, I desire to have it understood that obvious changes may be made within the scope of the following claims without departing from the spirit of my invention.

I claim:

1. A tire pressure alarm for use in conjunction with a tire valve stem including a casing designed for attachment to the valve stem, a spring urged actuating member within said casing, an alarm member in the path of said actuating member adapted to be struck thereby, a cord holding said actuating member in inoperative position, a chamber in said casing communicating with the valve stem and subject to pressure therein, a plunger urged in one direction by spring pressure and urged in the opposite direction by tire pressure in said chamber, and means carried by the plunger for cutting said cord.

2. The structure described in claim 1 and in which the actuating member supports a firing pin and the alarm member constitutes a cartridge supported by said casing in the path of movement of said firing pin.

3. The structure described in claim 1 and including a diaphragm between said chamber and said plunger and engaging the end of the plunger.

4. A tire pressure indicator including a casing, a cartridge supported by said casing, a hammer movably supported in said casing for movement against said cartridge, spring means urging said hammer against said cartridge, a cord for holding said hammer out of contact with said cartridge, a knife blade, and means sensitive to air tire pressure movably supporting said knife blade in a direction to cut said cord upon a decrease in the pressure.

5. The structure described in claim 4 and in which the means supporting the knife blade is spring urged in a direction to force the knife blade against the cord and cut same.

6. The structure described in claim 4 in which the hammer comprises a generally U-shaped spring strip.

7. The structure described in claim 4 and in which the means movably supporting the knife blade comprises a plunger urged in one direction by tire pressure and urged in the other direction by spring means.

HERBERT G. BENZ.

References Cited in the file of this patent

UNITED STATES PATENTS

| Number | Name | Date |
| --- | --- | --- |
| 583,543 | Nelson | June 1, 1897 |
| 1,281,274 | Berry | Oct. 15, 1918 |
| 1,633,361 | Bryant | June 21, 1927 |